Figure 1:
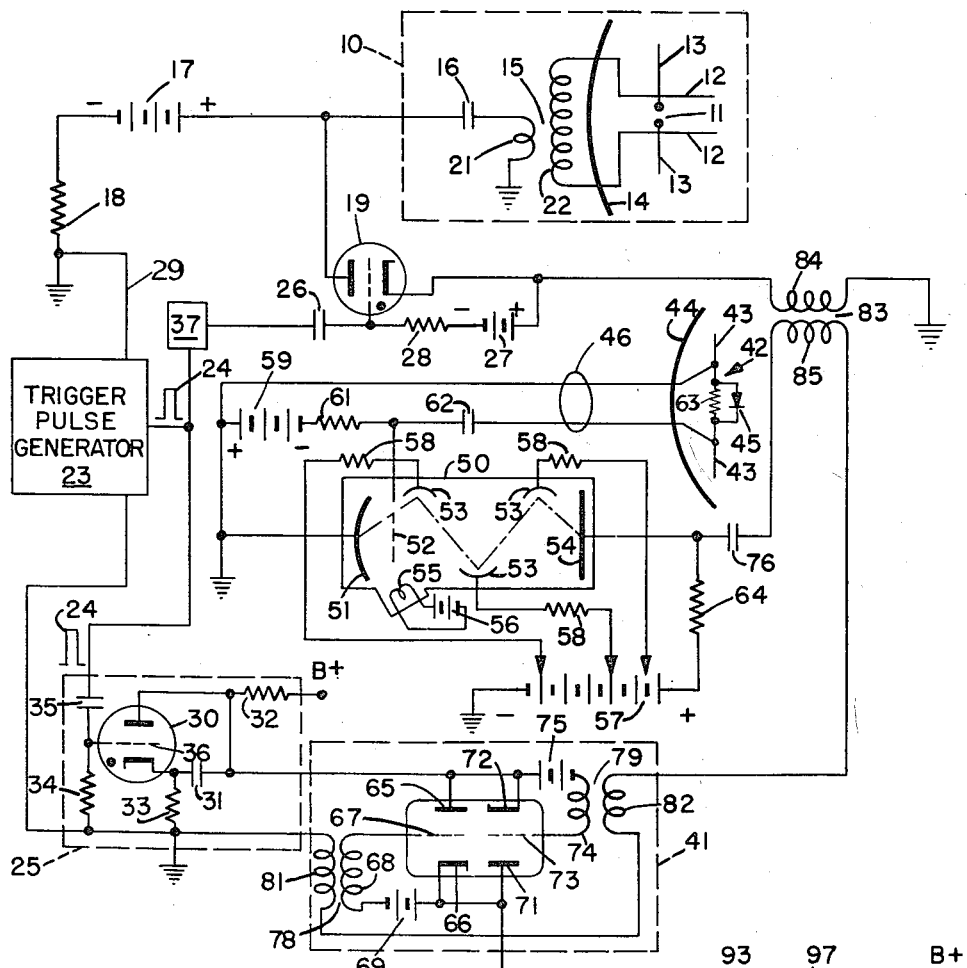

TO VACUUM TUBE VOLTMETER

INVENTOR.
EDWIN E. TURNER JR
BY
HIS ATTORNEY

Patented Jan. 26, 1954

2,667,574

UNITED STATES PATENT OFFICE 2,667,574

RADIO RECEIVER SYSTEM

Edwin E. Turner, Jr., West Roxbury, Mass., assignor to Raytheon Manufacturing Company, a corporation of Delaware Original application November 29, 1947, Serial No. 788,811, now Patent No. 2,496,900, dated February 7, 1950. Divided and this application April 26, 1949, Serial No. 89,603

3 Claims. (Cl. 250—20)

This is a division of my copending application, Serial No. 788,811, filed November 29, 1947, now Patent No. 2,496,900, dated February 7, 1950.

The present invention relates generally to radio echo detecting and ranging systems, and more particularly to a system having very high ranging accuracy and very low minimum range. The invention is particularly suited for use in altimeter and collision warning systems in aircraft.

A particular object of the present invention is to provide a novel radio receiver antenna input circuit which is particularly suited to the reception of short pulse signals.

An absolute radio altimeter which will constantly indicate with a high degree of accuracy the height above ground, even to low values of the order of ten feet, of a fast-moving aircraft at all times and with the utmost simplicity has been sought after for some time. Such a system requires the employment of extremely short transmitted pulses, and consequently the band width of the received system must be extremely great. While radio echo altimeter systems have heretofore been devised, they have usually been lacking in high ranging accuracy and low minimum range, and have been heavy and complex in structure. The present invention provides a system which possesses low minimum range with high ranging accuracy, and may be made light in weight and relatively simple in construction, and which provides the desired range information as an indication on a conventional direct-reading galvanometer type meter which may be located where desired. As additional features, the meter may be adjusted to read range or height accurately from within the system, providing a reliable and simple performance check.

The invention envisions the employment of a very simple spark-type transmitter which provides exceedingly short pulses of electromagnetic radiation, of the order of 0.01 microsecond. These pulses are generated and radiated through a single unitary instrumentality. There is provided also an equally simple receiving, detecting, and amplifying system employing a separate antenna which incorporates a detector within itself, and, as an amplifier, only one electron tube of the electron multiplier type is provided. The receiver system is not tuned and hence is responsive to an exceptionally wide band of frequencies. In addition it requires little or no servicing. Range information is constantly provided on a meter through a "memory" device which operates at low voltages and is actuated only to record changes in the condition being observed. The memory device is arranged to perform accurately, and is not adversely affected by the indicating device connected thereto.

The invention is described below in connection with the drawing, which shows schematically in Fig. 1 an apparatus that may be used as an absolute altimeter or as a collision warning device, and in Fig. 2 a modification to provide for calibration of the meter.

In the system shown in Fig. 1, pulsed electromagnetic radiation is generated and propagated into space by a pulse generator-transmitter 10, shown generally in a dotted-line box. Pulse generator-transmitters suitable for the purposes of the present invention are shown in various forms in Patents Nos. 2,407,245; 2,408,405; 2,408,406; and 2,417,052. The pulse generator-transmitter 10 shown in Fig. 1 is generally like Fig. 2 of Patent No. 2,417,052, and will not be further described except to identify its principal parts, which are a spark gap 11, capacitor members 12 thereto connected, dipole radiators 13, a reflector 14, and a high tension step-up transformer 15. A storage capacitor 16 provides the energy for spark discharges. A battery 17 provides current for charging the capacitor 16, the charging path being completed through a protective resistor 18, ground, and the primary winding 21 of the transformer 15. A normally non-conductive electronic switch tube 19, which is preferably a gaseous discharge tube, and may desirably be of the hydrogen thyratron type, discharges the capacitor 16 to ground when rendered conductive, to provide a current surge in the primary winding 21 of the transformer 15. This surge provides a high voltage in the secondary winding 22, and a pulse of electromagnetic energy is generated, as described in the above-mentioned patents. The resistor 18 prevents short-circuiting of the battery 17 during conductivity of the tube 19.

A trigger pulse generator 23 provides a very short positive voltage pulse 24 which is fed to the switch tube 19 and to a saw-tooth voltage generator 25 in parallel. The positive pulse 24 is applied to the control grid of the switch tube 19 through a coupling capacitor 26. This grid is biased negatively with respect to the cathode by means of a battery 27, which is connected between the grid and the cathode through a current-limiting resistor 28. The positive charge stored in the capacitor 26 after a positive pulse 24 has been applied to the grid leaks off through the resistor 28, ground, and the ground connection wire 29 of the pulse generator 23, so that the tube 19 soon again becomes non-conductive in preparation for the next trigger pulse. The discharge path of the storage capacitor 16 is through the tube 19, the primary winding 84 of a transformer 83 (the purpose of which will be explained below), ground, and the primary winding 21 of the pulse transformer 15. The impedance of this path is very low, so that the capacitor 16 discharges very quickly and the tube 19 is therefore quickly extinguished. This arrangement permits the employment of high pulse repetition rates, of the order of 300,000 pulses per second, which are useful in short range systems for altimeter purposes.

The saw-tooth voltage generator 25 is of a conventional form, and comprises an electron tube 30, which may be of the gaseous type, a charging capacitor 31 wherein a substantially linearly increasing voltage is periodically generated, and a charging resistor 32. The charging capacitor 31 and charging resistor 32 are connected in series across a source of unidirectional voltage, B+ to ground, and the tube 30 is connected at its anode and cathode across the capacitor 31. A resistor 33 is provided in the cathode circuit, through which the charging current flows and biases the cathode positively with respect to ground. The charging capacitor 31 is charged only to a small fraction of the available B+ voltage at any time, so that the voltage across the capacitor increases substantially linearly with time during each charging operation. The control electrode 36 of the tube 30 is connected to ground through a resistor 34, and to the cathode through the resistors 33 and 34 in series, and is thus biased negatively with respect to the cathode. The bias provided is sufficient to maintain the tube 30 non-conductive for the range of anode-cathode potentials that is used. The positive pulse 24 is applied to the control electrode 36 through a coupling capacitor 35, and renders the tube 30 conductive at about the same time that the generator-transmitter switch tube 19 is fired. The positive voltage that is thus applied to the control electrode 36 leaks off through the grid resistor 34, ground, and the trigger pulse ground wire connection 29 and, due to the low anode-cathode voltage that exists when the charging capacitor 31 is discharged through the tube, the tube 30 is very quickly rendered non-conductive again. Recharging of the capacitor 31 provides the positive cathode (or negative grid) bias through the cathode resistor 33 to maintain the tube non-conductive until the next succeeding trigger pulse 24.

At the termination of the conductive period of the tube 30, the next succeeding linear voltage sweep commences, almost simultaneously with the generation and transmission of a pulse of radio frequency energy by the generator-transmitter 19. The discharge time of the saw-tooth generator capacitor 31 through the tube 30 may introduce some delay in the commencement of the sweep voltage. To avoid this delay and start the sweep voltage exactly when the energy pulse is transmitted, a phase shifter 37 may be interposed between the trigger pulse generator 23 and the switch tube 19 if desired, so that the trigger pulse 24 fed to the switch tube will arrive there a small time after the saw-tooth voltage generator tube 30 is fired.

The saw-tooth voltage generated in the saw-tooth generator capacitor 31 is applied across a measuring capacitor 40 through a normally-open electronic switch 41 and ground. The normally-open switch is controlled by a radio receiver, as will be described below.

The radio receiver system has an antenna 42, which may include as its elements a dipole 43 and a parabolic reflector 44. A unidirectional conductor 45, for example, a crystal, is connected directly between the elements of the dipole 43, as a detector, so that pulsed unidirectional current only appears in the antenna connection cable 46 when echoes of the transmitted energy are received in the receiver antenna 42. To protect the crystal 45 from being burned out during the generation and transmission of energy pulses, the generator-transmitter 19 and the receiver antenna 42 may be located at opposite ends of the wing of the aircraft.

Unidirectional current pulses from the receiving antenna 42 are brought to a wide-band amplifier which comprises an electron-multiplier tube 50 having a photoemissive cathode 51, a control electrode 52, a plurality of secondary electron emitters 53, an anode 54, and a light source 55. The light source 55 is energized by a battery 56, and arranged to illuminate the cathode 51, which emits electrons. A battery 57 provides positive potentials for the secondary electron emitters 53 and the anode 54. The negative terminal of the battery 57 and the cathode 51 are grounded, while the positive terminal of the battery is connected to the anode 54 through a plate load resistor 64. Each of the secondary electron emitters 53 is connected to an individual intermediate point on the battery 57 through a current-limiting resistor 58. The secondary electron emitters 53 are each made increasingly positive with relation to the cathode 51, the most positive secondary electron emitter being the one furthest from the cathode 51, or nearest to the anode 54. Electrons emitted from the cathode are thus attracted to the secondary emitter 53 nearest to the cathode, where by impact they cause the emission of an increased number of secondary electrons. The secondary electrons are further attracted to the next furthest removed secondary emitter, where the process is repeated, until the electron stream that arrives at the anode 54 is vastly multiplied in density by comparison with the electron stream emitted by the cathode.

The particular electron multiplier tube employed may have a photoemissive cathode and a light source, as shown and described herein, or, if desired, a thermionic cathode may be employed. Either kind of cathode can furnish electrons by random emission. However, the thermionic cathode requires heat and consequently eventually causes contamination of the secondary emitter surfaces. In the practical constructions of photoemissive electron multipliers that are available, the light source is either enclosed, or the light is brought to the cathode by a devious path by way of a mirror, so that no contamination of the secondary emitter surfaces occurs. Due to these advantageous characteristics, the photoemissive electron multiplier provides a very highly satisfactory wide band amplifier, having a high signal-to-noise ratio.

The flow of electrons from the cathode 51 is controlled by a control grid 52, interposed between the cathode and the nearest secondary emitter 53. The control grid 52 is normally biased negatively with respect to the cathode 51 by means of a battery 59 connected between the cathode and the control grid through a resistor 61. The electron stream is thus held to a certain low, steady-state value, or, if desired, cut off altogether. The unidirectional signals from the antenna 42 are applied across the grid resistor 61 through a capacitor 62 in such a fashion as to drive the control grid 52 in a positive direction with relation to the cathode 51. A resistor 63 of high value is connected across the unidirectional conductor 45, and the charge thus given to the control grid 52 leaks off through this resistor, through a circuit including the bias battery 59 and the grid resistor 61. The time constant of this circuit is preferably chosen to be very short. The grid control is effective where the electron density is low, and thereafter amplification takes place as a characteristic of the tube 50 itself. The electron stream thus increases in density when an echo pulse is received in the antenna 42, and the resultant current flow in the plate load resistor 64 causes a voltage drop at the anode 54 which is employed to close the normally open switch 41 to place a charge on the measuring capacitor 40 in a manner that will now be described.

The normally open switch 41 comprises a pair of triode sets, the first set comprising a first anode 65, first cathode 66, and first control electrode 67, and the second set comprising a second anode 71, second cathode 72, and second control electrode 73. The first anode 65 and the second cathode 72 are connected together and to the output of the saw-tooth generator 25. The first cathode 66 and second anode 71 are connected together and to one side of the measuring capacitor 40. The other side of the measuring capacitor is grounded. The first control electrode 67 is connected to the first cathode 66 through the secondary winding 68 of a first pulse transformer 78 and a first bias battery 69 in series. The second control electrode 73 is connected to the second cathode 72 through the secondary winding 74 of a second pulse transformer 79 and a second bias battery 75 in series. The bias batteries 69 and 75 normally bias the triode sets in which they are connected to cutoff, thus keeping the switch 41 normally open.

The voltage drop at the electron multiplier anode 54 is the receiver output signal, in the form of a unidirectional output pulse, and is connected through a coupling capacitor 76 to the primary windings 81 and 82 of the first and second pulse transformers 78 and 79 in series. The connection is such that, when there is a receiver output signal, both control electrodes 67 and 73 are driven sufficiently positive with relation to their respective cathodes 66 and 72 to overcome the bias furnished by the batteries 69 and 75, respectively. The transformer 83 is employed as a lock-out pulse transformer and has its primary winding 84 connected in series in the anode-cathode circuit of the generator-transformer switch tube 19, and its secondary winding 85 connected in series in the signal transmitting circuit to the normally-open switch 41. The signal transmitting circuit thus includes, in all, in series connection, the coupling capacitor 76, the secondary winding 85 of the lock-out transformer, the primary windings 81 and 82 of the two pulse transformers, ground, the amplifier battery 57, and the output resistor 64 in which the output signal appears. Any charge remaining on the coupling capacitor 76 after the transmission of a pulse therethrough is dissipated through the signal transmitting circuit. The time constant of this circuit is preferably very short.

The output pulse thus furnished to the normally-open switch 41 overcomes the negative bias of each triode section. The triode sections are reversely connected in parallel in the circuit to the measuring capacitor 40, so that one or the other triode section conducts current depending on which of the two capacitors 31 and 40 has the higher potential at the time when the output pulse is impressed on the switch 41. Thus, if the saw-tooth generator capacitor 31 is at that instant charged more positively than the measuring capacitor 40, the first anode 65 and first cathode 66 become conductive; or, if the saw-tooth generator capacitor 31 is at that instant charged only to a value that is negative with respect to the potential of the measuring capacitor 40, the second anode 71 and second cathode 72 become conductive. In either event, the measuring capacitor 40 is momentarily connected to the saw-tooth generator capacitor 31 and assumes the same charge, or, more exactly, the same potential level above ground. The closing of the switch 41 is momentary only, because the pulse transformers unblock their respective control electrodes only when there is a sudden voltage change in the plate load resistor 64. This sudden change is insensitive to the duration of the pulse that follows. The lock-out pulse transformer is connected in the signal transmitting circuit in a fashion to oppose the action of the two signal pulse transformers 81 and 82, and is effective to prevent unblocking of the control electrodes 67 and 73 during the generation and transmission of an energy pulse. Any grid current that may be drawn by the control electrodes 67 and 73 is confined to the respective local grid-cathode, and does not affect the charge on the measuring capacitor 40. Such grid current, if it does occur, may be minimized by the inclusion of grid circuit resistors (not shown) in the respective grid-cathode connections if desired.

The potential that is present at any time on the measuring capacitor 40 is indicated in a vacuum tube voltmeter circuit comprising two electron tubes 91 and 92. The first tube 91 is connected at its anode 93 directly to a source of unidirectional voltage B+, which is preferably well regulated, and at its cathode 94 to ground through a cathode resistor 95. The control electrode 96 is connected to the switch side of the measuring capacitor 40. The second tube 92 is connected at its anode 97 to the B+ supply, and at its cathode 98 to ground through a second cathode resistor 99. A potential divider 101 is connected directly from B+ to ground, and the second tube control electrode 102 is connected to the potential divider through a variable tap 103. A meter 104, which may be a sensitive galvanometer, and a variable resistor 105 are connected in series between the two cathodes 94 and 98.

The first tube 91 of the vacuum tube voltmeter is operated as a cathode follower, and thus has substantially infinite impedance, and never draws grid current. The cathode potential follows the grid potential very accurately, and the charge on the measuring capacitor cannot be dissipated through the tube. The second tube is operated as a voltage divider, and, by means of the adjustable tap 103, adjusts the potential of the second tube cathode 98 to be the same as that of the first tube cathode 94 when the meter 104 is expected to read "zero." The adjustable tap 103 is thus a "minimum" reading adjustment. The variable resistor 105 controls the amount of meter deflection per voltage unit, and adjusts the meter to read a desired "maximum" value. These two adjustments are the range calibration adjustments of the system, and, as will be shown, can be made within the system.

In the system of the invention described above, the measuring capacitor 40 functions as a "memory" device with respect to the range or distance to a single target that is being continuously observed, for example, the earth beneath a moving aircraft. Since the resistance of the circuit connecting the saw-tooth generator or sweep capacitor 31 and the measuring capacitor 40 together is low, only a few signals need be received by the receiver to charge the measuring capacitor to the same potential level as the sweep capacitor. Thereafter if the range, or in this case, the altitude, is increasing, each received signal will be effective to render the switch 41 conductive through the first anode 65 and first cathode 66, for the sweep voltage increases with time. On the other hand, if the altitude is decreasing, the second anode 71 and second cathode 72 will become conductive during each observation thereof, for the measuring capacitor 40 will then be charged more positively than the sweep capacitor 31. If there is no change in the altitude between succeeding received echoes, neither triode section of the switch 41 will become conductive, for, although the control electrodes 67 and 73 will be momentarily disposed to permit conduction, the respective anodes and cathodes will all be at the same potential, and no electrons will pass through either triode section. As mentioned above, if grid current should occur, it is localized in the respective grid-cathode circuits, and does not effect the charge on the measuring capacitor. Since the vacuum tube voltmeter has practically infinite input impedance, the "memory" of the measuring capacitor 40 is very long; that is, the capacitor holds its charge for a very long time in the absence of signals that alter it in the normal operation of the system. Alteration of the charge on the measuring capacitor is made in either direction, so that there is no delay in responding to changes in terrain contour or range to an object in horizontally directed measuring systems. Since, as mentioned above, the circuit to the measuring capacitor 40 has little resistance, response to sudden changes in range or terrain contour is accurate. The meter 104 reads the range or altitude directly.

Figure 2:
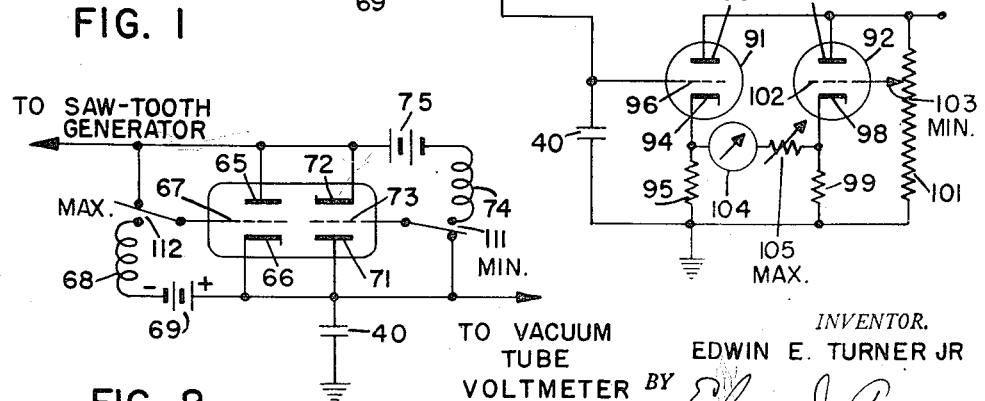

When the sweep length is known in terms of range or distance, and the sweep is synchronized with the transmitted pulse, the meter 104 can be calibrated within the system by means of the modification shown in Fig. 2. To the measuring capacitor switch 41 are added two single-pole double throw switches 111 and 112. The first switch 111 is a Minimum, or Zero Range, adjustment switch. Normally this switch connects the second control electrode 73 to the second cathode 72 as shown in Fig. 1, but for calibration purposes this grid is connected directly to the second anode 71. The second triode section is then rendered conductive over the whole sweep cycle of the saw-tooth generator 25, and the measuring capacitor 40 assumes the lowest sweep voltage available. In the vacuum tube voltmeter, the Minimum adjustment tap 103 is then adjusted until the voltage difference between the two cathodes 94 and 98 is zero, and the meter 104 reads "zero." The first switch 111 is now returned to the normal position, and the second switch 112 is operated to the calibrate position. This has the effect of making the first triode section conductive between the first anode 65 and first cathode 66 over an entire sweep voltage cycle, and the measuring capacitor 40 assumes the highest sweep voltage available. In the vacuum tube voltmeter, the Maximum adjustment resistor 105 is then adjusted until the meter reads the maximum range to which the full sweep length is equivalent. The second switch 112 is then returned to its normal position to connect the first control electrode 67 to its cathode 66 and restore normal operation of the measuring capacitor switch 41.

Many modifications of the above described embodiment may be made within the scope of the invention to accommodate a particular employment thereof. For example, the meter 104 may be replaced by any one of many forms of threshold alarms known to the art, and the invention can then serve to light a lamp or sound a bell when the altitude of the aircraft becomes dangerously low or a collision becomes imminent. In certain of its aspects, for example, the system for controlling the measuring capacitor switch 41 for the measuring capacitor 40, the invention may find employment in other types of echo ranging equipment.

Having now described my invention, I claim:

1. A receiver for electromagnetic radiation comprising: a dipole antenna; a unidirectional conductor connected directly across the output of said antenna; and wide band amplifier means coupled through a capacitor to said unidirectional conductor to amplify signals therefrom, said amplifier including electron tube means having an input control electrode and a cathode; a resistor connected in shunt with said unidirectional conductor; a capacitive connection from one end of said resistor to said control electrode; and a connection from the other end of said resistor to said cathode.

2. A receiver for electromagnetic radiation comprising: a dipole antenna; a unidirectional conductor connected directly across the output of said antenna; and amplifier means coupled through a capacitor to said unidirectional conductor to amplify signals therefrom, said amplifier means comprising a photoemissive cathode, a control electrode, a plurality of secondary electron emissive electrodes, an anode, and means for illuminating said photoemissive cathode, and being arranged as an electron multiplier to amplify the stream of electrons from said photoemissive cathode under the control of said control electrode, a connection including a capacitor from one side of said unidirectional conductor to said control electrode, a connection from the other side of said control electrode to said cathode, and a resistor connected in shunt with said unidirectional conductor.

3. A receiver for electromagnetic radiation comprising a dipole antenna, a unidirectional conductor connected directly across the output of said antenna, a resistor connected directly in shunt with said unidirectional conductor, and an amplifier having its input connected across said resistor.

EDWIN E. TURNER, Jr.

References Cited in the file of this patent
UNITED STATES PATENTS

| Number | Name | Date |
|---|---|---|
| 2,097,514 | Chaffee | Nov. 2, 1937 |
| 2,124,533 | Barbulesco | July 26, 1938 |
| 2,131,042 | Halstead | Sept. 27, 1938 |
| 2,169,358 | Hollmann | Aug. 15, 1939 |
| 2,298,960 | McRae | Oct. 13, 1942 |
| 2,416,376 | Cawein | Feb. 25, 1947 |
| 2,523,398 | Southworth | Sept. 26, 1950 |
| 2,539,594 | Rines | Jan. 30, 1951 |
| 2,543,085 | Willoughby | Feb. 27, 1951 |